(12) United States Patent
Bernet et al.

(10) Patent No.: US 7,747,490 B2
(45) Date of Patent: Jun. 29, 2010

(54) SYSTEMS AND METHODS FOR CREATING A DATABASE FOR ACCOUNTING PURPOSES

(75) Inventors: Kerstin Bernet, Bammental (DE); Werner Liebold, Wiesloch (DE); Georg Dopf, Schwetzingen (DE)

(73) Assignee: SAP AG, Walldorf (DE)

( * ) Notice: Subject to any disclaimer, the term of this patent is extended or adjusted under 35 U.S.C. 154(b) by 996 days.

(21) Appl. No.: 11/137,530

(22) Filed: May 26, 2005

(65) Prior Publication Data

US 2005/0267825 A1      Dec. 1, 2005

(30) Foreign Application Priority Data

May 29, 2004   (EP)   ................... 04012832
Aug. 21, 2004   (EP)   ................... 04019877

(51) Int. Cl.
*G06Q 40/00*   (2006.01)
(52) U.S. Cl. ....................................... 705/35
(58) Field of Classification Search .................... 705/35
See application file for complete search history.

(56) References Cited

U.S. PATENT DOCUMENTS 5,806,042 A * 9/1998 Kelly et al. ..................... 705/4
6,735,604 B2 * 5/2004 Miller et al. ................ 707/201

2003/0046194 A1 * 3/2003 McClendon et al. .......... 705/30
2005/0278295 A1   12/2005 Bernet et al.

OTHER PUBLICATIONS

Accounting and review service statements, by Chad Piehl; pp. 18-20 Apr./May 2002.*
Organizing the selection system process for a new general ledger sysem, by Kenton B. Walker; v96n2 pp. 3 1996.*
Real-Time Accounting System, by Zabihollah Rezaee; v LVII, n II, p. 62-67 Apr. 2000.*
Communication from the European Patent Office for European Application No. EP 05 744 947.2 dated Jul. 17, 2007 (5 pages).
Garcia-Molina, Hector et al., "Database Systems: The Complete Book," 2002, Department of Computer Science, Stanford University, 7 pages; 340-345 and 348.

* cited by examiner

*Primary Examiner*—Hani Kazimi
*Assistant Examiner*—Hatem Ali
(74) *Attorney, Agent, or Firm*—Finnegan, Henderson, Farabow, Garrett & Dunner, LLP (57) ABSTRACT

A database is created for accounting purposes, which can be used to prepare financial statements according to various statutory accounting principles. According to one method, document data records are saved from posting documents to a document database. The document data records include a document header and a data part. The data part includes entries for at least two items each of which comprises a posting amount and an account assigned thereto. Calculation of totals from one or more posting amounts of the document data records are saved for the accounts assigned thereto. The totals are saved to totals entries of a totals table.

31 Claims, 4 Drawing Sheets

| Document | Edit | Goto | Extras | Settings | Environment | System | Help |

Display Document: Recording View

Taxes | Display Currency | General Ledger View | Other Ledger

Recording View

| Document Number | 1900000009 | Company Code | 1040 | Fiscal Year | 2004 |
| Document Date | 30.04.2004 | Posting Date | 30.04.2004 | Period | 4 |
| Reference | | Cross-Comp.No. | | | |
| Currency | GBP | Text Available | | Ledger Group | |

| CCde | Item | PK | Status | Account | Description | Segment | Profit Center | Cost Center | Amount | Currency | Taxes | D/C |
|---|---|---|---|---|---|---|---|---|---|---|---|---|
| 1040 | 1 | 31 | | DEMO_ROT | Demo | | | | 1.000,00- | GBP | V1 | C |
| | 2 | 40 | | 400000 | Consumption Raw Materials 1 | SEGA | ROT1 | ROT10 | 521,74 | GBP | V1 | D |
| | 3 | 40 | | 400000 | Consumption Raw Materials 1 | SEGB | ROT2 | ROT20 | 347,82 | GBP | V1 | D |
| | 4 | 40 | | 154000 | Input Tax | | | | 130,44 | GBP | V1 | D |

Q3A (1) (800) us0308 INS

Fig. 3

Display Document: General Ledger View

Recording View
- Document Number: 1900000009
- Document Date: 30.04.2004
- Reference:
- Currency: GBP
- Company Code: 1040
- Posting Date: 30.04.2004
- Cross-Comb.No.:
- Text Available: ☐
- Fiscal Year: 2004
- Period: 4

Ledger FL
- Document: 1900000009
- Fiscal Year: 2004
- Period: 4
- Ledger Group:

| CCde | Item | L.Item | PK | Status | Account | Description | Segment | Profit Center | Cost Center | Amount | Currency | Taxes | D |
|---|---|---|---|---|---|---|---|---|---|---|---|---|---|
| 1040 | 1 | 000001 | 31 | | 160000 | AP-Domestic | SEGA | ROT1 | | 600,00- | GBP | | C |
| | 1 | 000002 | 31 | | 160000 | AP-Domestic | SEGB | ROT2 | | 400,00- | GBP | | C |
| | 2 | 000003 | 40 | | 400000 | Consumption Raw Materials 1 | SEGA | ROT1 | ROT10 | 521,74 | GBP | V1 | D |
| | 3 | 000004 | 40 | | 400000 | Consumption Raw Materials 1 | SEGB | ROT2 | ROT20 | 347,82 | GBP | V1 | D |
| | 4 | 000005 | 40 | | 1540000 | Input Tax | SEGA | ROT1 | | 78,26 | GBP | V1 | D |
| | 4 | 000006 | 40 | | 1540000 | Input Tax | SEGB | ROT2 | | 52,18 | GBP | V1 | D |

SYSTEMS AND METHODS FOR CREATING A DATABASE FOR ACCOUNTING PURPOSES

This application claims the benefit of priority from European Patent Application No. 04012832.4, filed May 29, 2004, and European Patent Application No. 04019877.2, filed Aug. 21, 2004. The entire contents of EP 04012832.4 and EP 04019877.2 are expressly incorporated herein by reference to their entireties.

BACKGROUND

I. Technical Field

The present invention generally relates to database systems and related methods. More particularly, the invention relates to computer-implemented systems and methods for creating a database for accounting purposes, such as for preparing financial statements according to various statutory accounting principles.

II. Background Information

Typically, company reports of a corporate group are based on business transactions, each of which are recorded in a document. For example, a business transaction may be an incoming supplier invoice or the withdrawal of goods from stores for production purposes. Large corporate groups incur thousands or hundreds of thousands of such business transactions each month. To facilitate the preparation of a company report within an acceptable time period, totals referred to as totals records are updated in addition to the documents for each account of an enterprise. The totals are saved to totals entries of a totals table and reflect the totals of posting amounts of a posting account, e.g., for a posting period. The individual business transactions are recorded (manually or automatically) via a document entering process, which may be centralized, and are saved as document data records to a document database. In this context, document data records are referred to as single item entries.

Today, many corporate groups must comply with a plurality of statutory accounting principles when preparing and publishing their annual financial statements. For example, a German group listed on a U.S. stock exchange must submit a financial statement under US-GAAP and/or IAS as well as under HGB. It is possible that further financial statements are necessary, for example for subsidiaries in Asian countries, according to local rules. In concrete terms, this means that a plurality of annual financial statements must be prepared and published at the same time. However, the annual financial statements are based on different statutory accounting principles. At the end of a fiscal year, balance-sheet items must, for example, be valued according to the strict lowest cost or market principle for a financial statement under HGB and according to the market price on the reporting date for a financial statement under US-GAAP.

For that reason, it is the task of the accounting department of a corporate group to prepare all data that is relevant to accounting according to different statutory accounting principles. To date, there have been the following fundamental software solutions to comply with these requirements:

Parallel Accounting

The user creates additional accounts (parallel accounts). In this case, accounting entries are made in a common account if they are identical for all statutory accounting principles or they are made in a specific account for each statutory accounting principle if they differ as to the statutory accounting principle used. For the purpose of the annual financial statement, both the common accounts and the accounts for the specific statutory accounting principle are valued for all statutory accounting principles.

As a consequence of this procedure, the number of all accounts to be managed may become very large and, thus, hard to cope with for the bookkeeper. This occurs when a relatively large number of accounting entries differ for various statutory accounting principles. If reporting requires more than two statutory accounting principles, this method is very complex and work-intensive.

Additional General Ledgers with Separate Data-Keeping

By way of example, the SAP R/3 Enterprise system provides an FI-SL (special ledger) application having the character of a toolbox. This application allows the customer to create his or her own general ledgers for additional reports according to statutory accounting principles in separate tables. Posting operations that are only relevant to one of these additional reports must then be entered and posted for the appropriate general ledger via a separate document entering process. As a consequence, this process creates general ledgers that are not directly integrated in central accounting and must, therefore, be matched to each other, this requiring a great amount of work.

According to the state of the art, a corporate group can prepare its financial statements only with the use of data processing systems if related efforts are to be justifiable. The accounting of an internationally active group requires entry and valuation of many millions of posting operations. The individual posting items are saved to databases. The data volume has to be kept as small as possible. Further, the option of an efficient check of individual posting items for auditing purposes must be provided for, and adjustment entries must be included in all group financial statements to be prepared according to the various statutory accounting principles. The matching of data for financial statements according to different statutory accounting principles is particularly work-intensive and represents a possible source of errors.

If an invoice, for whatever reason, is changed after it has already been entered, it must be ensured that this change is taken into consideration in all accounts, journals and general ledgers in which the invoice was entered according to the various statutory accounting principles. As a result, the architecture of an accounting database must meet high requirements to cope with millions of posting operations.

Therefore, a technical solution is needed for preparing financial statements with less effort according to different statutory accounting principles on the basis of a database structure. In addition, various financial statements should have access to matching data.

SUMMARY

According to an embodiment of the present invention, a computer-implemented method is provided for creating a database for accounting purposes that can be used to prepare financial statements according to statutory accounting principles. The method comprises saving document data records from posting documents to a document database. The document data records comprise a document header and a data part and the data part comprises entries for at least two items each of which comprises a posting amount and an account assigned thereto. The header of the document data records specifies the statutory accounting principles for which the particular document data record is to be considered. Items are automatically generated and assigned in the data part of the document data record for the statutory accounting principles; one or more totals entries with one or more totals are created in the totals table pertaining to an account for each of the statutory accounting principles to be considered. The totals in totals entries pertaining to a statutory accounting principle are only calculated with posting amounts from items that are assigned to a particular statutory accounting principle. Totals are calculated from one or more posting amounts of the document data records saved for the accounts assigned thereto and the totals are saved to totals entries of a totals table.

In one embodiment, the method further includes generating an input mask that comprises input fields for the document header and the data part of the document data record to be created. The input mask may be provided for the purpose of enabling the entry of document data records on a screen. Further, in the input mask, the input fields of the document header may be graphically set off against the input fields of the data part.

Consistent with a further embodiment, a document data record may comprise a general data part used to save general posting information that is relevant to all financial statements and a specific data part used to save posting information that has been derived from the general data part and is relevant to the particular financial statement is generated in relation thereto. When a specific data part is generated for a document data record, the general data part of the single item entry may be checked for partial posting amounts that are allocated to different organizational units of an enterprise and, if so, posting amounts of the general data part may be, in the specific data part, allocated to the corresponding organizational units in relation to the partial posting amounts.

Consistent with embodiments of the invention, the document header and the general data part of a document data record may be saved in the database only once and the specific data parts may be generated automatically.

According to another embodiment of the present invention, a computer program product is provided that can be directly loaded to the memory of a digital computer and which comprises software sections or modules used to execute the steps of a method when the product is run on a computer. The method may comprise saving document data records from posting documents to a document database. The document data records comprise a document header and a data part and the data part comprises entries for at least two items each of which comprises a posting amount and an account assigned thereto. The header of the document data records specifies the statutory accounting principles for which the particular document data record is to be considered. Items are automatically generated and assigned in the data part of the document data record for the statutory accounting principles; one or more totals entries with one or more totals are created in the totals table pertaining to an account for each of the statutory accounting principles to be considered. The totals in totals entries pertaining to a statutory accounting principle are only calculated with posting amounts from items that are assigned to a particular statutory accounting principle. Totals are calculated from one or more posting amounts of the document data records saved for the accounts assigned thereto and the totals are saved to totals entries of a totals table.

It is understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

BRIEF DESCRIPTION OF THE DRAWINGS

The accompanying drawings, which are incorporated in and constitute a part of this disclosure, illustrate various embodiments and aspects of the present invention. In the drawings:

FIG. 1 shows an exemplary input mask for line item entries;

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims and the equivalents thereof.

In methods consistent with embodiments of the present invention, it is no longer necessary to increase the number of the accounts required according to the number of relevant statutory accounting principles. As a result, bookkeepers find their daily work facilitated to a considerable degree. Furthermore, in such methods of the present invention, data that is relevant to the various financial statements according to different statutory accounting principles may be saved in a database only once. Accordingly, it is no longer necessary to match different data records to each other when corrections or audits are made. Furthermore, memory requirements may be reduced. Based on uniform data entry and data-keeping, a separate general ledger can be kept for each statutory accounting principle, without having to perform matching work.

In any enterprise, there are a plurality of business transactions which are assessed uniformly with regard to the various statutory accounting principles. These business transactions are relevant to all financial statements and do not cause any extra effort to the bookkeeper while he enters documents manually, irrespective of the number of financial statements to be prepared. Business transactions which are relevant only to a single statutory accounting principle can also be posted via a central document entering process. For example, an entry must be made in the document header of the document data record documenting the particular business transaction, the entry specifying the financial statement, i.e., the general ledger or the statutory accounting principle, to which it is relevant. In such a case, only the totals for the particular financial statement are updated. As a matter of course, the user can also proceed in this manner for a group of totals for different financial statements. The totals for all financial statements pertaining to the group specified in the document header of the document data record are updated automatically.

In order to create a document data record for a business transaction, an input mask or graphical user interface (GUI) is preferably generated on a screen. A bookkeeper will then enter the appropriate data in the screen. The input mask may comprise an input field where the financial statement or group of financial statements for which the associated document data record is to be considered is explicitly specified. As a matter of course, the specification of the particular financial statement is the same as the specification in the general ledger used to prepare the financial statement. This can, for example, be implemented by a corresponding entry in a field of the document header and/or an item line.

In one embodiment, in those cases where no entry is made in the corresponding input field, the associated document data record is automatically taken into consideration for all financial statements. In other words, it is assumed that the document data record is to be considered for all statutory accounting principles. Accordingly, an entry in the corresponding input field is not necessary. Since a great number of accounting entries according to a plurality of statutory accounting principles are made in the same manner, embodiments consistent with the present invention may further reduce the efforts required for preparing the financial statements.

A document entry view (as shown by the example in FIG. 2) may show a document at the granularity the bookkeeper used when the document was manually entered in a document entry mask or at the granularity at which the document was received via an interface in case of automatic entry. Among others, the view depending on the general ledger (as shown by the example in FIG. 3) may show the fields the content of which is saved for updating the totals of the general ledgers concerned. Further, according to methods of the invention for creating a database for accounting purposes, a document data record corresponding to a posting document may be saved to a document database for each business transaction.

Consistent with an embodiment of the invention, FIG. 1 shows an example of an input mask, which comprises a plurality of input fields. The input mask may be generated by a computer program on a screen of a computer system. The input fields of the input mask may be used to enter the data related to a document data record for the purpose of entering a business transaction.

A document data record may comprise a document header and a data part. In the input mask, the input fields of the document header are arranged above the input fields of the data part such that they are graphically set off against each other. In the example of FIG. 1, the title of the data part is "Item". The input fields of the document header of the input mask are provided for entry of a company code identifying the associated company (or subsidiary), a document date, and a posting date. It is also possible to save an external reference number and/or additional information in the document header. In addition, it is not necessary to enter the information saved in the document header of a document data record as a whole via the input mask. For example, the computer program may automatically assign a unique document number and saves it to the document header. Furthermore, the computer program can determine the appropriate posting period (e.g., quarter or fiscal year) on the basis of the document date and also save it in the document header.

Consistent with embodiments of the present invention, a "Ledger Group" input field may be provided in the input mask. This input field can be used to specify one or more general ledgers and, thus, the financial statements to which the associated document data record is relevant. This assignment can be made additionally or, as an alternative, also automatically by the program, for example, by determining the type of business transaction according to predetermined rules, the type being used to make the assignment according to further rules which can be preset. The result may already be specified in the "Ledger Group" input field either as an editable or as a defined parameter.

The fact that a separate general ledger is kept for each of the various statutory accounting principles allows the creation of a database which can be used to generate the accounts according to different statutory accounting principles, without much effort being necessary. Unless an entry is made in the "Ledger Group" input field, the related document data record is automatically considered for all general ledgers, i.e., it is assumed that it is to be considered for all statutory accounting principles.

In the simplest case, it suffices to enter a single item, i.e., to fill in one line of the input fields of the data part by specifying one account and one posting amount. In simple cases and if the setting of the data processing system is appropriate, the related contra account can be supplemented automatically, with the result that the document data record reflects a complete entry formula. As a matter of course, the account can also be entered manually by the bookkeeper.

Figure 2:
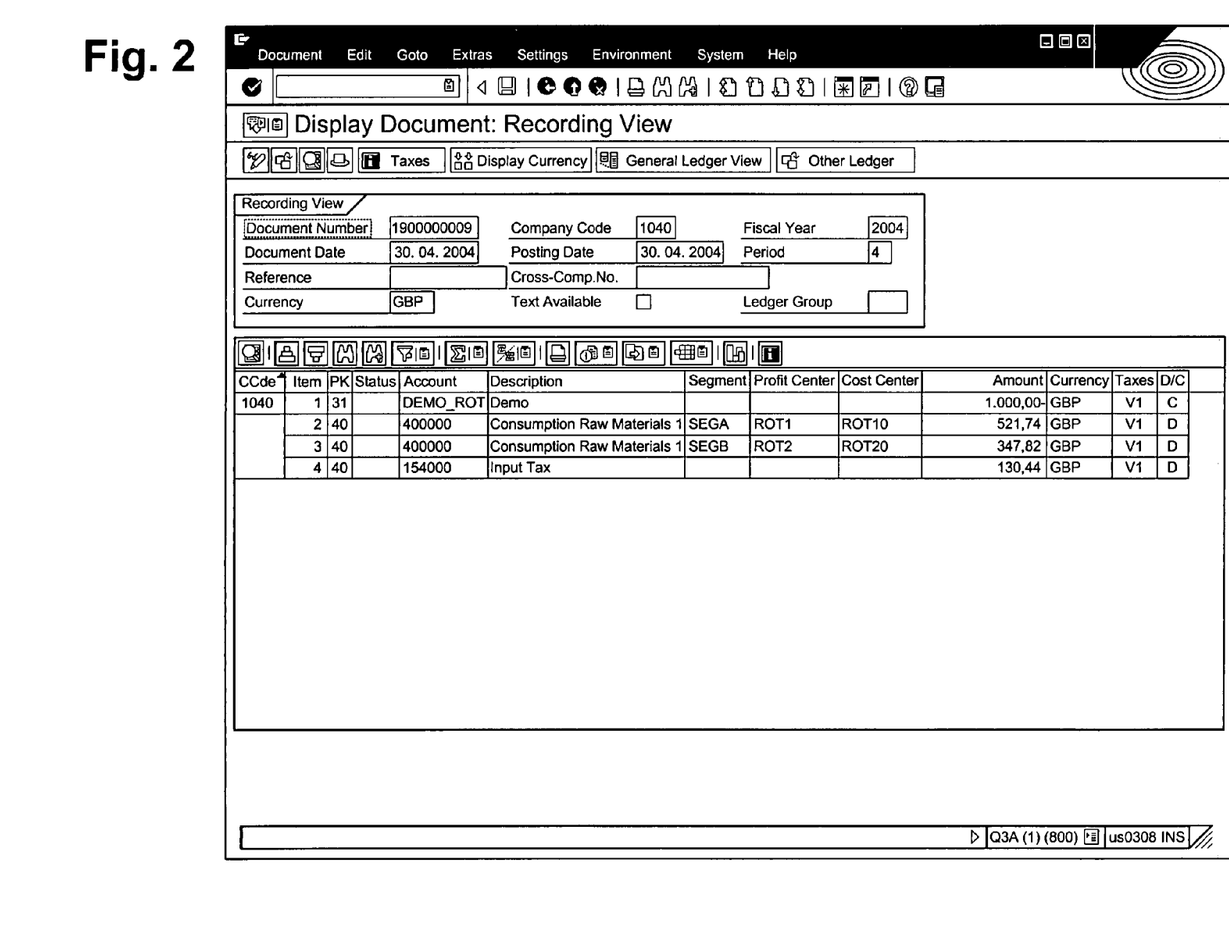
FIG. 2 shows an exemplary document entry view of a document data record.

FIG. 2 shows the document entry view of a document data record. The data part of a document data record comprises a plurality of items each specifying a posting account and a posting amount. In the exemplary embodiment shown, the items are represented as lines. Herein, payables are credited to the DEMO_ROT vendor in the first line. In lines 2 and 3, the offset posting of the corresponding expense is entered in account 400000 in two partial amounts. The expense is unequally allocated to the two SEG A and SEG B segments. Furthermore, in line 4, an input tax is debited to account 154000, with the result that the amounts debited and credited are the same and the document data record is balanced.

In the exemplary embodiment shown, a part of the information already contained in the document header is additionally saved once more to the data part, thus facilitating a database search. The redundant information that is additionally saved to the data part comprises, in particular, the company code and the currency used for the entry. Further input fields of the input mask of the data part can be used to specify a posting key (PK) and information on the tax treatment of the entry, for example, via the value-added-tax rate to be applied.

The data part of the document data record which is illustrated by lines 1 through 4 of the document entry view shown in FIG. 2 is a general data part. This data part is used to save posting information that is not dependent on a general ledger, but is relevant to all general ledgers concerned. Hence, there is no entry in the "Ledger Group" field in the document entry view shown in FIG. 2. Although relevant to all general ledgers, the document data record shown in FIG. 2 is not adequately detailed to comply with all statutory accounting principles. For example, IAS or US-GAAP principles require that a segmental disclosure be prepared for the appendix to a group financial statement. This is not necessarily required for a financial statement under other statutory accounting principles.

A comprehensive segmental disclosure requires that a business transaction involving a plurality of segments be allocated to the various segments both on the debit side and the credit side. However, an allocation of the expense as it is shown in the document entry view of FIG. 2 suffices for some of the statutory accounting principles and internal reports.

To prepare a full balance sheet for the various segments of an enterprise, as it is, for example, required under IAS, an additional specific data part may be generated from the general data part. The specific data part is used to save posting information that is derived from the general data part and is relevant for the particular general ledger. If the expense of an invoice is distributed over a plurality of segments (segments SEG A and SEG B in the example shown), items, i.e., document lines, each allocating a partial posting amount to the particular segment, must be generated for each posting amount. This can be achieved automatically or manually. The particular segments can be specified explicitly in the general data part of a document data record or can be derived automatically from the specification of more specific organizational units of an enterprise, e.g., profit centers uniquely assigned to a specific segment.

The amount of payables to a vendor and the amount of an input tax must be transferred from the incoming invoice while documents are entered. For that reason, the amounts are, for the time being, not allocated to the particular segments (see lines 1 and 4 in FIG. 2). When a specific data part is generated for a document data record, the general data part of the document data record is first checked for partial posting amounts that are allocated to different organizational units (e.g., segments) of an enterprise. If this is the case, the corresponding items are subdivided in partial items which are used in the specific data part to allocate posting amounts to the corresponding organizational units in relation to the partial posting amounts. In the example shown, these are the amount of the payables to the vendor (FIG. 2, line 1) and the amount of the input tax (FIG. 2, line 4).

These items are automatically subdivided in partial items while they are updated. This process may include an automatic check to determine for which general ledgers the segments specified in the general data part are relevant as an additional allocation to an account. In one embodiment, a specific data part supplementing the document data record is generated for each of these general ledgers. Hence, in methods consistent with the invention, the specification in the document header may allocate a document data record as a whole to one or more general ledgers, provided it contains an item at all that is relevant to the general ledger concerned. On the other hand, the individual items or partial items may be each assigned to one or more general ledgers.

Figure 3:
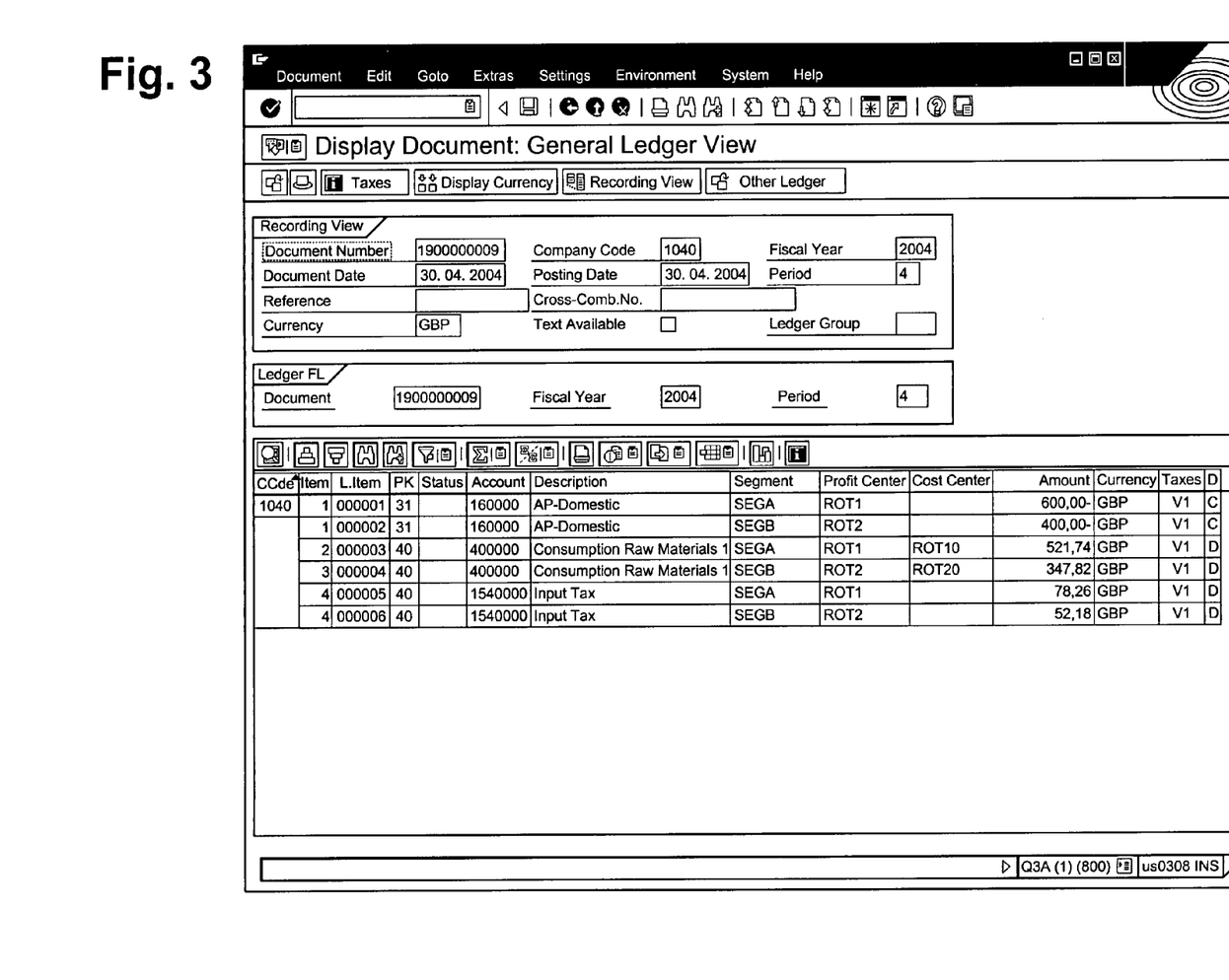
FIG. 3 shows an exemplary view of a single item entry that is dependent on a general ledger.

FIG. 3 shows an example of a general-ledger-dependent view of a document data record illustrated by means of the document entry view shown in FIG. 2. This general ledger view shows all of the posting items, such that they are each allocated to the two partial segments SEG A and SEG B as partial amounts. This results in a total of six posting lines. The $2^{nd}$ column in FIG. 3 specifies the respective line of the document entry view forming the basis of each of these posting lines. The document header and the general data part of a document data record must be saved in the database only in a single place and that the specific data parts can be generated automatically if necessary. In this manner, the data volume to be managed by the database can be reduced.

Where financial statements do not require any allocation of the posting amounts to segments or require such allocation in part only, specific data parts containing a correspondingly lower number of document lines may be generated. In special cases, which are, however, rather rare in practice, the specific data part may also be blank or may not be applicable at all, provided the general data part is sufficient for the general ledger concerned, i.e., for the financial statement concerned.

A totals entry containing in a totals data part a total of posting amounts of an account of the document data record can be generated in the totals table for each statutory accounting principle and, thus, for each general ledger. These totals entries can be updated constantly so that even new document data record can also be taken into consideration. It is, however, also possible to completely recalculate the totals table or the totals at periodic intervals or at selectable points in time.

A logical key can be assigned to each totals entry, the key specifying the criteria used to sum up the posting amounts in the particular totals entry. The key may comprise a number of logical key fields specifying, for example, a posting account, a profit center, a segment, a posting period, or the like as such criteria. In other words, the key can specify which posting amounts are to be summed up from which account, i.e., which document lines are to be taken into consideration.

Based on the totals entries, the respective financial statements can, in addition, be valued by segments by including the segment as a key field in the totals table. This is referred to as segmental disclosure. As a matter of course, such a procedure is not restricted to segments only, but can also be applied to further entities, such as profit centers as internal areas of responsibility, or to branch-specific entities, such as titles in the media industry. Accordingly, methods consistent with the invention may permit the use of reports as they are required for the financial statement of a corporate group, for example, for a balance sheet, a segmental disclosure, or internal reports on other entities.

Due to their usual architecture, databases are limited in their number of key fields, e.g., to 16 key fields. In order to allow a number exceeding the maximum number of key fields—sixteen in the example—to be nevertheless assigned to a totals entry, each key contains seven numbers each of which is compiled to a specific combination of types of logical key fields by means of seven key tables assigned to the numbers. In this manner, almost any number of logical key fields can be implemented. Accordingly, totals entries can be generated for a correspondingly large number of criteria, such as account, profit center, segment, posting period, or the like. As a matter of course, it is also possible to use a higher or lower number of key tables containing the corresponding number of numbers in the key. In particular, it is also possible to specify user-defined criteria and to include such criteria in the key tables.

In the exemplary embodiments described, partial amounts of a posting amount can be allocated to different segments, profit centers or other organizational units. As a result, cost and earnings of the various segments can be easily determined by evaluating the document data records saved in the document database. The data part of a document data record can also easily contain a significantly larger number of input fields per line than in the figures shown. Thereby, individual titles for the media industry can, for example, be entered in addition to segments, and segmental disclosure or internal reporting on various projects can be achieved as detailed as desired by evaluating the various entries in the database.

To be able to prepare as comprehensive reports as possible and, if necessary, even a balance sheet for various profit centers, projects or segments, a computer programs consistent with the invention may be used to generate partial items from the document items entered with which partial amounts are calculated according to the two accounts containing segment allocation (lines 2 and 3 for account 400000 in FIG. 2). In the partial items, partial amounts of the original posting amounts are allocated to different segments for the other account(s) of the document data record. According to the view shown in FIG. 3, partial amounts of a posting amount for individual profit centers or other organizational units can be entered both on the debit side and the credit side. This is referred to as document split and will be described in more detail below.

In the exemplary embodiments shown, a computer program may generate two additional lines for the document data record of the database. In these lines, GBP 400.00 and GBP 600.00 are allocated to segments SEG A and SEG B respectively on account 160000. Where document splits with partial amounts being allocated to different profit centers are concerned, it suffices to enter this document splitting explicitly either on the debit side or on the credit side. The data processing program automatically generates an appropriate document splitting for the other accounts. Accordingly, a balance sheet may be prepared for individual profit centers, segments, or other organizational units of an enterprise.

Figure 4:
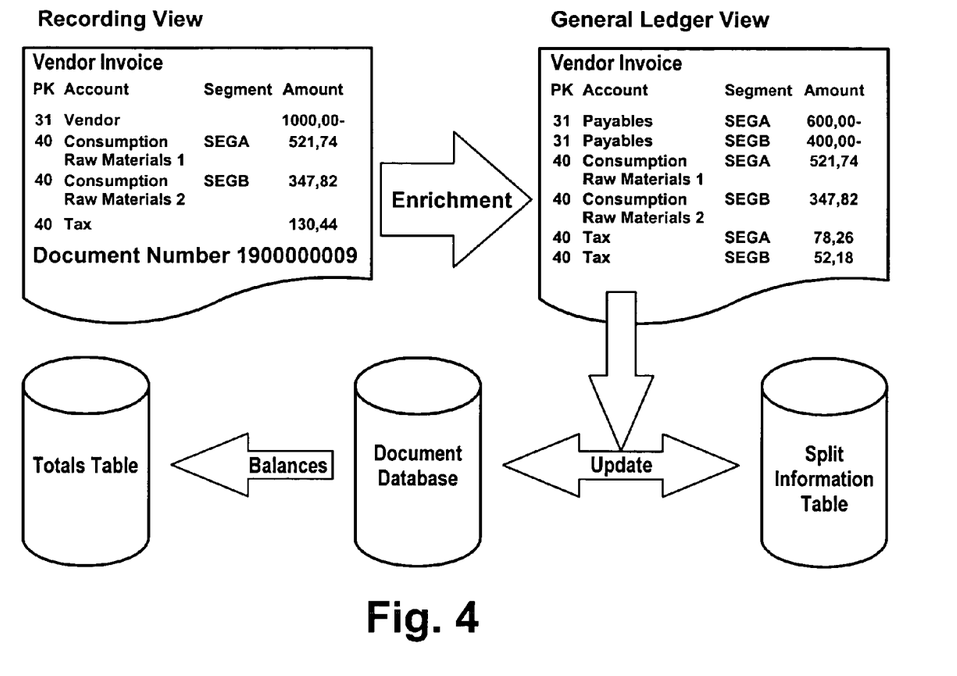
FIG. 4 is a diagram illustrating an exemplary document split.

For purposes of illustration, the steps that may be used for a document split are illustrated in the exemplary embodiment shown in FIG. 4. In a first step, a document data record having the document number 1900000009 is generated by means of the input mask shown in FIG. 1, for example, for the business transaction of a vendor invoice. To achieve this, the bookkeeper enters four items (document lines).

As shown in FIG. 4, in the first document line, payables amounting to GBP 1,000.00 are entered for the "DEMO_ROT" vendor. In the following line, an amount of GBP 521.74 is entered for raw material 1 which is assigned to segment SEG A. In line 3, an expense amounting to GBP 374.82 is entered for raw material 2 and allocated to segment SEG B. Either expense is entered in account 400000. In total, the invoice amount of GBP 1,000.00 contains an input tax amounting to GBP 130.44, which is listed in document line 4. Using the "Vendor Invoice" business transaction specified in the document header of the document data record, an online splitter pertaining to a program according to the invention detects that both the payables (line 1) and the tax (line 4) are to be allocated to the segments involved, i.e., SEG A and SEG B, in proportion to the expense amounts (line 2 and line 3). Based on this data, the splitter generates, in an enrichment step, two additional document lines, for example, for a journal under IAS, as can be seen in FIG. 3.

In relation to the partial amounts on account 400000 (see FIG. 3), the posting amount of GBP 1,000.00 is allocated to the individual segments SEG A and SEG B by supplementing the complete document data record with the specific data part. This complete document data record is saved in a document database, wherein an additional entry is generated in a split information table, the entry indicating the document split for posting document 1900000009. In the next step, totals entries of a totals table are generated from the document data records of the document database.

Accordingly, the requisite information is additionally filed to the split information table, so that payment or cash discount amounts can be appropriately allocated to the segments involved, i.e., SEG A and SEG B, in follow-up processes, for example, the payment of payables. This can, for example, be achieved by filing to the split information table a reference to the document and to a rule applied or by saving the split amounts or a split ratio with reference being made to the document.

If the document number of the document data record of the original business transaction (e.g., an incoming invoice) is entered or recorded in any other manner while a follow-up process is recorded via the input mask, the computer system can also automatically implement the document split for the document data record of a follow-up process, using the split information table.

The document data records saved to a document database are evaluated in a first step by generating totals entries in a totals table, the totals entries containing in a totals data part a total of posting amounts of a posting account of the document data records. These totals entries may be automatically updated at regular intervals to include new document data records that have been added in the meantime.

Per company code, posting period, account, segment, and further flexibly adjustable classifications, totals entries can be generated for each general ledger, i.e., for each financial statement. These additional classifications can be set separately for each general ledger, i.e., for each statutory accounting principle. Thereby, a business report with a financial statement or an internal report can be prepared easily and quickly for each statutory accounting principle, which is represented by the respective general ledger, as defined by the central management of the group. In the next step, a balance sheet can be prepared for each relevant statutory accounting principle, based on the individual totals entries. This can be achieved automatically, because the individual totals entries that are related to a specific general ledger each correspond to a specific statutory accounting principle.

In accordance with embodiments of the invention, a plurality of views can be created for each document data record, i.e., for each document. This is first of all the view that is not dependent on any general ledger (FIG. 2) and that displays the document data record with its general data part as it has been entered manually in the input mask or received automatically via a machine interface. In addition, a general-ledger-dependent document view intended to generate and save a specific data part can be created for each general ledger. The general-ledger-dependent document view displays all fields and/or document lines that are relevant to updating the totals entries related to the particular general ledger concerned (see FIGS. 2 and 3). The general-ledger-dependent document views may, in particular, also contain the additional document items that have been generated by the online split. Each of these additional document items can, preferably, be uniquely linked to a line of the document entry view. In total, all of the partial posting amounts listed in the general-ledger-dependent document view result precisely in the posting amount of the underlying line of the document entry view. The general-ledger-dependent document view may also contain offsetting items, for example if it is intended to prepare a full balance sheet for a specific segment and, hence, the account balance of each document data record must also be zero for each segment.

Figure 5:
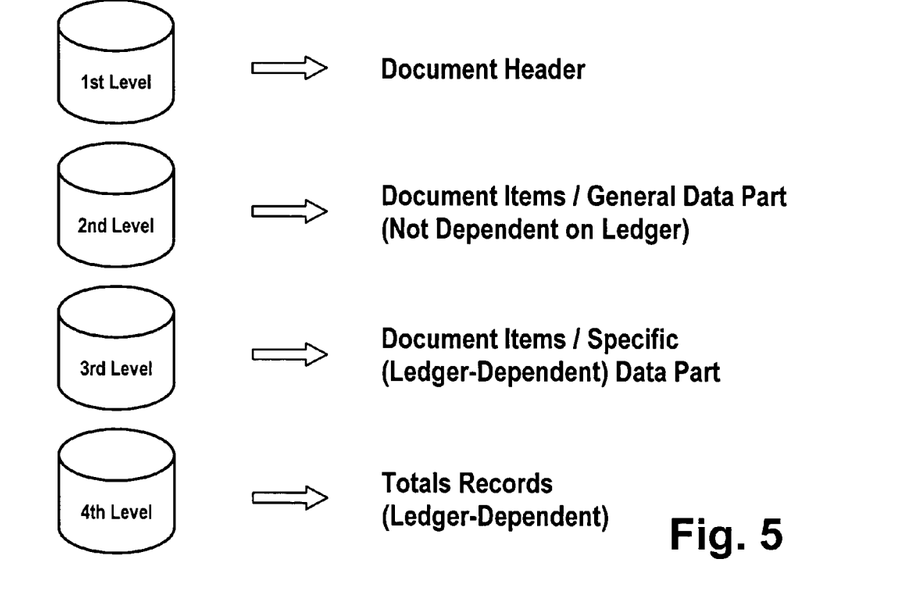
FIG. 5 is a diagram of an exemplary database structure.

This may result in a data structure similar to that shown by the example of FIG. 5. The first level of the data structure is formed by the document header of the document data records. The second level is formed by the general data part of the document data records (document items). This is followed by the specific data part of the document data records as the third level. These levels form the basis of the fourth level of the data structure, i.e., the totals entries.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for creating a database for accounting purposes, including the preparation of financial statements according to statutory accounting principles, the method, executed by hardware in a computer, comprising:

saving document data records from posting documents to a document database, each document data record comprising:

a document header specifying one or more statutory accounting principles for which the particular document data record is to be considered; and a data part comprising entries for at least two items, each of which comprises a posting amount and an account assigned thereto;

wherein items are automatically generated in the computer and assigned in the data part of the document data record for each of the statutory accounting principles to be considered, the items being assigned to a the particular statutory accounting principle identified for the item in the document header, and calculating totals in the computer from one or more posting amounts of the document data records saved for the accounts assigned thereto; and saving the totals to totals entries of a totals table within the computer, one or more totals entries with one or more totals being created in the totals table pertaining to an account for each of the statutory accounting principles to be considered, the account being specific to each statutory accounting principle identified in the document header, wherein the totals in the totals entries pertaining to a statutory accounting principle are only calculated in the computer with posting amounts from items that are assigned to a the particular statutory accounting principle identified for the totals in the totals entries in the document header.

2. The method according to claim 1, wherein the statutory accounting principles to be taken into consideration are specified automatically.

3. The method according to claim 1, wherein the method further comprises:

generating an input mask in the computer for purposes of entering document data records on a screen, the input mask comprising:

input fields for the document header and the data part of each document data record to be created, and wherein, in the input mask, the input fields of the document header are graphically set off against the input fields of the data part.

4. The method according to claim 3, wherein the input fields of the document header are arranged above the input fields of the data part.

5. The method according to claim 3, wherein the financial statement or financial statements to which the related document data record is relevant can be entered in a further input field of the document header.

6. The method according to claim 5, wherein in a document data record, the further input field that does not contain any entry will be considered for all financial statements.

7. The method according to claim 1, wherein a document date or a posting date are entered in the document header of the document data record.

8. The method according to claim 1, wherein a company code is entered in the document header of the document data records.

9. The method according to claim 1, wherein at least one debit account and one credit account are entered in the data part of a document data record and partial posting amounts on an account can be allocated to different organizational units of an enterprise.

10. The method according to claim 1, wherein a document data record comprises a general data part used to save general posting information that is relevant to all financial statements and a specific data part used to save posting information that has been derived from the general data part and is relevant to the particular financial statement is generated in relation thereto.

11. The method according to claim 10, wherein when a specific data part is generated for a document data record, the general data part of the single item entry is checked for partial posting amounts that are allocated to different organizational units of an enterprise and, if so, posting amounts of the general data part are, in the specific data part, allocated to the corresponding organizational units in relation to the partial posting amounts.

12. The method according to claim 10, wherein the document header and the general data part of a document data record are saved in the database only once and the specific data parts are generated automatically.

13. The method according to claim 1, wherein a key determines the criteria used to form the totals entries from the various document data record, wherein the key comprises a plurality of logical key fields specifying these criteria.

14. The method according to claim 13, wherein the key contains a number which is compiled to a specific type of logical key fields by means of a key table.

15. A computer program product that can be directly loaded to the memory of a digital computer and which comprises software used to execute the steps of a method when the computer program product is run on a computer, the method comprising:
saving document data records from posting documents to a document database, each document data record comprising:
a document header specifying one or more statutory accounting principles for which the particular document data record is to be considered; and
a data part comprising entries for at least two items, each of which comprises a posting amount and an account assigned thereto;
wherein items are automatically generated in the computer and assigned in the data part of the document data record for each of the statutory accounting principles to be considered, the items being assigned to a the particular statutory accounting principle identified for the item in the document header, and
calculating totals in the computer from one or more posting amounts of the document data records saved for the accounts assigned thereto; and
saving the totals to totals entries of a totals table within the computer, one or more totals entries with one or more totals being created in the totals table pertaining to an account for each of the statutory accounting principles to be considered, the account being specific to each statutory accounting principle identified in the document header,
wherein the totals in the totals entries pertaining to a statutory accounting principle are only calculated in the computer with posting amounts from items that are assigned to a the particular statutory accounting principle identified for the totals in the totals entries in the document header.

16. The computer program product according to claim 15, wherein the statutory accounting principles to be taken into consideration are specified automatically.

17. The computer program product according to claim 15, wherein the method further comprises: generating an input mask for purposes of entering document data records on a screen, the input mask comprising: input fields for the document header and the data part of the document data record to be created, and wherein, in the input mask, the input fields of the document header are graphically set off against the input fields of the data part.

18. The computer program product according to claim 17, wherein the input fields of the document header are arranged above the input fields of the data part.

19. The computer program product according to claim 17, wherein the financial statement or financial statements to which the related document data record is relevant can be entered in a further input field of the document header.

20. The computer program product according to claim 19, wherein in a document data record, the further input field that does not contain any entry will be considered for all financial statements.

21. The computer program product according to claim 15, wherein a document date or a posting date are entered in the document header of the document data record.

22. The computer program product according to claim 15, wherein a company code is entered in the document header of the document data records.

23. The computer program product according to claim 15, wherein at least one debit account and one credit account are entered in the data part of a document data record and partial posting amounts on an account can be allocated to different organizational units of an enterprise.

24. The computer program product according to claim 15, wherein a document data record comprises a general data part used to save general posting information that is relevant to all financial statements and a specific data part used to save posting information that has been derived from the general data part and is relevant to the particular financial statement is generated in relation thereto.

25. The computer program product according to claim 24, wherein when a specific data part is generated for a document data record, the general data part of the single item entry is checked for partial posting amounts that are allocated to different organizational units of an enterprise and, if so, posting amounts of the general data part are, in the specific data part, allocated to the corresponding organizational units in relation to the partial posting amounts.

26. The computer program product according to claim 24, wherein the document header and the general data part of a document data record are saved in the database only once and the specific data parts are generated automatically.

27. The computer program product according to claim 15, wherein a key determines the criteria used to form the totals entries from the various document data record, wherein the key comprises a plurality of logical key fields specifying these criteria.

28. The computer program product according to claim 27, wherein the key contains a number which is compiled to a specific type of logical key fields by means of a key table.

29. A computer-readable storage medium containing computer executable instructions, which when executed by a computer processor performs a method for creating a database for accounting statements, including the preparation of financial statements according to statutory accounting principles, the method comprising:
saving document data records from posting documents to a document database, each document data record comprising:
a document header that specifies one or more statutory accounting principles for which the particular document data record is to be considered, and a data part comprising entries for at least two items, each of which comprises a posting amount and an account assigned thereto;
wherein items are automatically generated in the computer and assigned in the data part of the document data record for each of the statutory accounting principles to be considered, the items being assigned to the particular statutory accounting principle identified for the item in the document header, and
calculating totals in the computer from one or more posting amounts of the document data records saved for the accounts assigned thereto; and
saving the totals to totals entries of a totals table within the computer, one or more totals entries with one or more totals being created in the totals table pertaining to an account for each of the statutory accounting principles to be considered, the account being specific to each statutory accounting principle identified in the document header,
wherein the totals in the totals entries pertaining to a statutory accounting principle are only calculated in the computer with posting amounts from items that are assigned to the particular statutory accounting principle identified for the totals in the totals entries in the document header.

30. The computer-readable medium according to claim 29, wherein the document data record comprises totals entries which are saved to a totals table and are assigned to a posting account, and wherein the document data record comprises one or more totals entries for each of the statutory accounting principles to be considered, and the totals entries contain totals which are each calculated with posting amounts of posting documents, the posting amounts being allocated to the particular statutory accounting principle.

31. The computer-readable medium according to claim 29, wherein the data part contains items each of which is allocated to one or more statutory accounting principles.

* * * * *